United States Patent [19]

Schoessow

[11] 4,258,663
[45] Mar. 31, 1981

[54] LIVESTOCK FEEDER

[75] Inventor: John Schoessow, Pulaski, Wis.

[73] Assignee: Schoessow, Inc., Pulaski, Wis.

[21] Appl. No.: 973,532

[22] Filed: Dec. 26, 1978

Related U.S. Application Data

[63] Continuation of Ser. No. 625,656, Oct. 24, 1975, abandoned.

[51] Int. Cl.³ .............................................. A01K 5/00
[52] U.S. Cl. ........................................ 119/58; 119/60
[58] Field of Search ................... 119/58, 59, 60, 52 R; 296/3, 6, 8

[56] References Cited

U.S. PATENT DOCUMENTS

| 42,927 | 5/1864 | Close | 119/58 |
|---|---|---|---|
| 45,011 | 11/1864 | Allerton | 119/58 |
| 54,371 | 5/1866 | Lahm | 119/59 |
| 62,522 | 3/1867 | Blanchard | 119/58 |
| 64,983 | 5/1867 | Ives | 119/58 |
| 2,500,889 | 3/1950 | Winkler | 119/58 |
| 2,936,735 | 5/1960 | Smith | 119/52 R |
| 3,336,908 | 8/1967 | Swanson | 119/60 |
| 3,782,333 | 1/1974 | Feterl | 119/52 R |
| 3,834,353 | 9/1974 | Groezinger | 119/60 |

Primary Examiner—Hugh R. Chamblee
Attorney, Agent, or Firm—Michael, Best & Friedrich

[57] ABSTRACT

The livestock feeder includes a relatively shallow, open top tank having a substantially solid bottom and generally vertical side and end walls, a rack located inside the tank for receiving different types of feed and having a plurality of horizontally spaced frame members which extend upwardly from the tank bottom with their lower ends spaced inwardly from the tank walls to define feeding troughs therebetween, and an outer framework having a plurality of frame members which are arranged to discourage the withdrawal of loose feed from the feeder. In a preferred embodiment the frame members are horizontally spaced in parallel relationship and extend diagonally from the upper extremity of the tank walls. Adjacent pairs of the diagonally extending outer frame members define a vertically angled opening through which individual livestock can project its head, while standing on the ground outside any one of the four sides of the feeder, and eat feed held in the rack and/or the feeding troughs. The angled opening between the diagonally extending outer frame members discourages livestock from dragging feed from the feeder.

The central portion of the tank bottom preferably is raised and includes a pair of oppositely inclined walls which cause the feed to slide from inside the inner rack into the feeding troughs. When loose feed, such as chopped green feed or ground feed, is to be dispensed, panels are removably mounted on the inner frame members to define a bin for receiving the loose feed.

8 Claims, 6 Drawing Figures

LIVESTOCK FEEDER

CROSS REFERENCE TO RELATED APPLICATIONS

This application is a continuation of application Ser. No. 625,656, filed Oct. 24, 1975 now abandoned.

BACKGROUND OF THE INVENTION

This invention relates to livestock feeders and, more particularly, to livestock feeders for dispensing a variety of feeds for cattle and the like.

Livestock feeders which are capable of storing and dispensing fibrous feeds, such as baled hay and loose hay, to cattle and the like are well known. Many prior livestock feeders are not adaptable for dispensing loose feed, such as chopped green feed and ground feed. Other prior feeders, while adaptable for dispensing loose feeds, are arranged so that cattle can drag loose hay from the feeder and portions of the leaves, which often have a higher food value, are dropped on the ground and wasted. The feeding troughs of prior livestock feeders mounted on wheels for over-the-road travel typically are located at inconvenient or uncomfortable feeding heights for young or smaller stock, requiring them to pull hay therefrom for consumption with a resultant potential waste.

Representative examples of such prior livestock feeder constructions are disclosed in U.S. Pat. No. 3,782,333 (Feterl), issued Jan. 1, 1974 and in the sales brochures submitted herewith.

SUMMARY OF THE INVENTION

A primary object of this invention is to provide a multi-purpose livestock feeder which is adaptable for dispensing a wide variety of feeds.

Another object of this invention is to provide a livestock feeder which is arranged to minimize waste caused by livestock pulling feed therefrom onto the ground.

A further object of this invention is to provide a livestock feeder which can be used to feed both young and full-grown livestock.

Further objects, aspects and advantages of the invention will become apparent upon reviewing the following detailed description, the drawings and the appended claims.

The livestock feeder provided by this invention includes a tank having a substantially solid bottom and generally vertical walls extending upwardly from the bottom for receiving and holding feed and an outer framework including a plurality of frame members. Adjacent pairs of the outer frame members define an opening through which an individual livestock can insert its head to reach feed inside the feeder. Each opening has a configuration requiring the livestock to either cock its head or raise its head for insertion through the opening, thereby discouraging it from dragging fibrous feed from the feeder. In a preferred embodiment the outer frame members extend diagonally from the upper extremity of the tank walls in horizontally and parallel spaced relationship. The angled opening between adjacent pairs of the diagonal outer frame members requires individual livestock to turn or cock its head for insertion therethrough to reach the feed.

The feeder preferably includes an inner rack located inside the tank into which the feed is introduced and having a plurality of horizontally spaced frame members extending upwardly from the tank bottom. The lower ends of the rack frame members are spaced inwardly from the tank walls and cooperate with the tank bottom and walls to define feeding troughs.

The feeder can be made mobile as a unit by mounting the tank on wheels with the tank walls located at a comfortable eating height for both young and full-grown livestock while standing on the ground outside the feeder.

The central portion of the tank bottom located inside the inner rack preferably is raised and includes a pair of oppositely inclined walls angling downwardly and outwardly towards respective tank walls so that loose feed slides from the inner rack into the feeding troughs. The feeder can be adapted to dispense loose feeds, such as chopped green feed or ground feed, by mounting removable panels on the inner frame members. These panels serve to define a bin for receiving the loose feed and are spaced above the tank bottom to provide an elongated opening through which the feed can slide from the bin into the feeding troughs.

BRIEF DESCRIPTION OF THE DRAWINGS

FIG. 4 is a fragmentary, partially sectioned view of the towing tongue.

FIG. 5 is a fragmentary view of an alternate construction for the inner rack.

FIG. 6 is a reduced, fragmentary view of an alternate arrangement for the outer frame members.

DESCRIPTION OF THE PREFERRED EMBODIMENT

Figure 1:
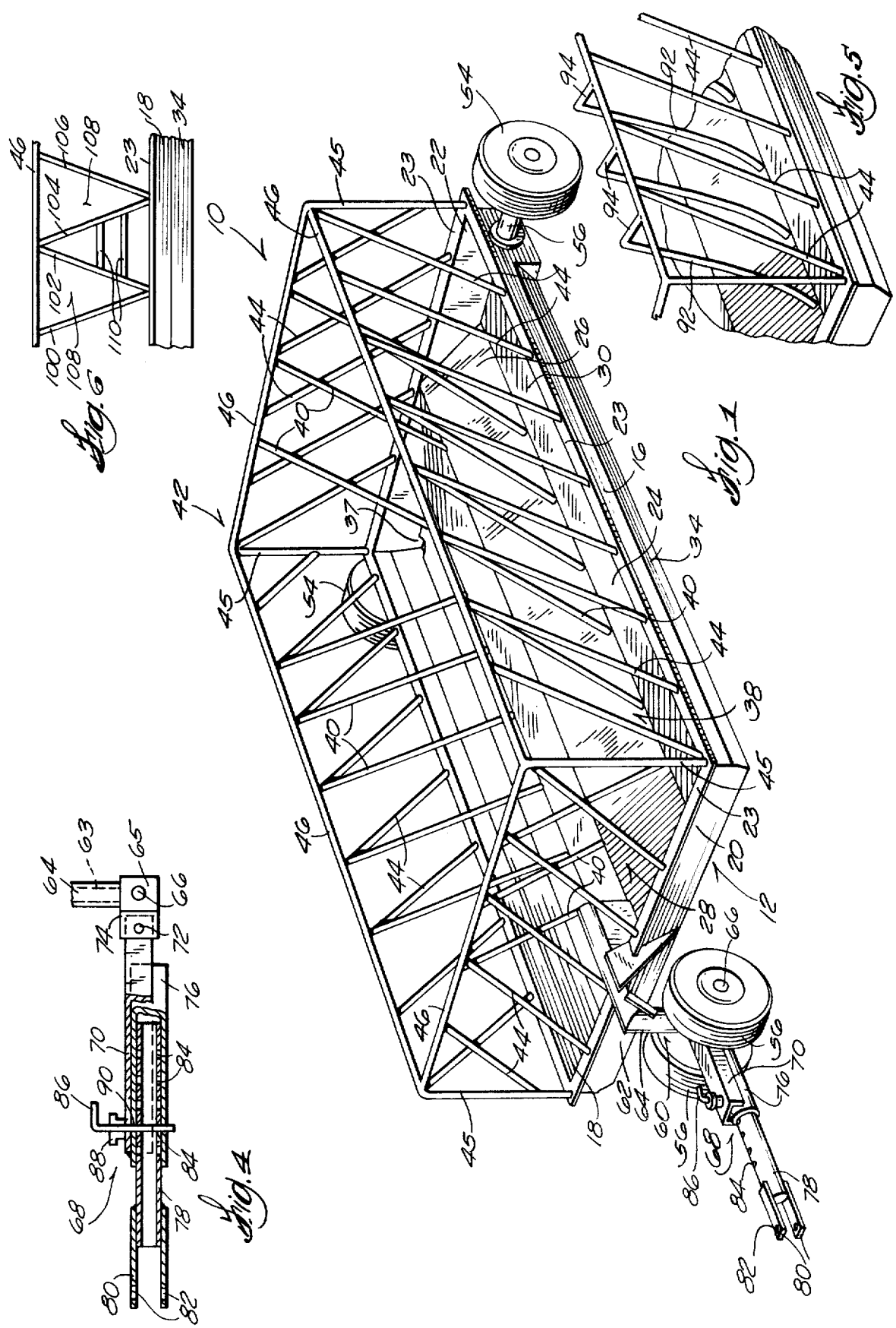
FIG. 1 is a perspective view of a livestock feeder embodying various of the features of the invention.

The feeder 10 includes a relatively shallow, open top tank 12 having a substantially solid bottom 14, a pair of opposed, generally vertical, side walls 16 and 18 extending upwardly from the longitudinal edges of the bottom 14 and a pair of opposed, generally vertical end walls 20 and 22 extending upwardly from the lateral edges of the bottom 14. The upper edges of side walls 16 and 18 and the end walls 20 and 22 terminate in a horizontally extending support flange 23 which preferably has rounded longitudinal edges to prevent snagging.

Figure 3:
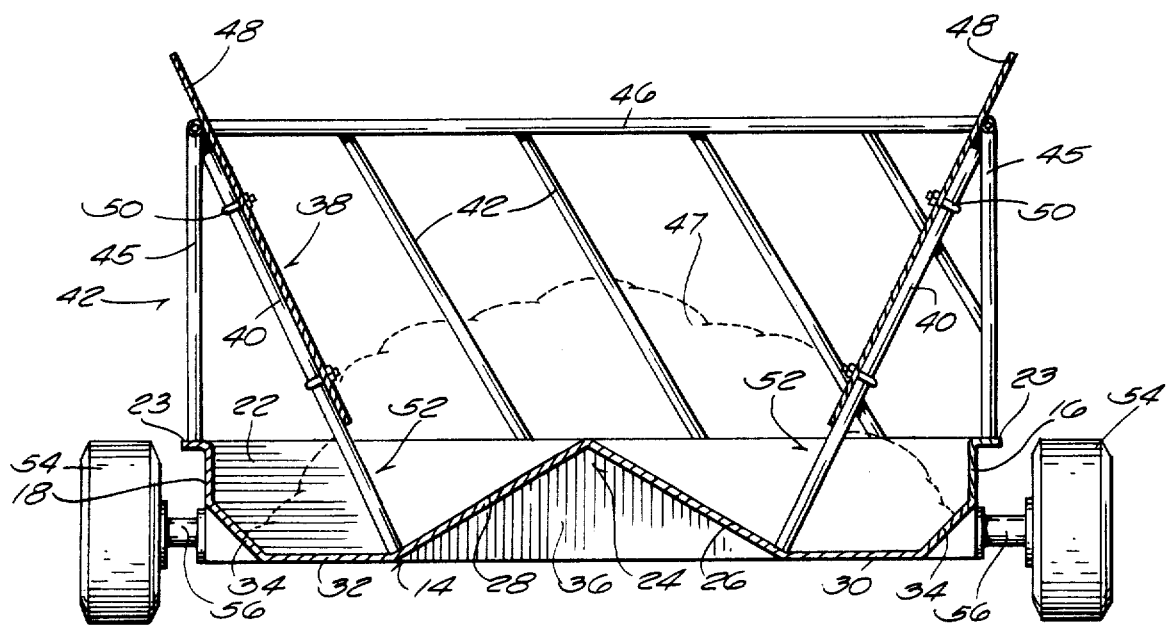
FIG. 3 is a sectional view taken along the line 3—3 in FIG. 2.

As best shown in FIG. 3, the tank bottom 14 has a raised central portion 24 including a pair of oppositely inclined walls 26 and 28 angling downwardly and outwardly and a pair of longitudinally extending, substantially flat portions 30 and 32 which extend outwardly from respective inclined walls 26 and 28 and in cooperation with the side walls 16 and 18 and the end walls 20 and 22 define feeding troughs. In order to facilitate consumption of all of the feed held in the feeding troughs by livestock, the marginal portions 34 of the bottom 14 adjacent the side walls preferably are inclined upwardly and outwardly towards the respective side wall. This eliminates square outer corners in which loose feed can accumulate and is relatively inaccessible to livestock feeding from outside the feeder 10.

The tank 12 preferably is constructed from a sheet metal material, such as hot or cold rolled steel, and is formed as an integral unit, i.e., a unit body construction.

For instance, separate sheets of metal can be bent to form one-half of the bottom, one side wall and the respective support flange, these sections welded together at the joint formed by adjoining upper edges of the inclined walls 26 and 28, and the pre-formed end walls including an integrally formed support flange, then welded to the opposite ends of this sub-unit. If desired, the bottom, the side walls and the support flanges therefor can be formed by bending from a single sheet of metal. A plurality of triangularly-shaped gussets 36 can be mounted, such as by welding, on the underside of the inclined walls 26 and 28 in longitudinally spaced relation to provide added structural strength. Preferably, a drain hole 37 (one shown in FIGS. 1 and 2) is provided in the bottom of the tank at each corner.

Located inside the tank 12 for receiving feed, in the form of round or square bales, silage, haylage, chopped hay, ground feed or chopped green feed, is a rack 38 including a plurality of horizontally-spaced, upwardly extending frame members 40. Loose feed located inside the rack 38 slides down the inclined walls 26 and 28 into respective feeding troughs. The lower ends of the inner frame members 40 are spaced inwardly from the respective side wall or end wall and are connected, preferably by welding, to the tank bottom 14. As best shown in FIGS. 1 and 3, the lower ends of the inner frame members 40 associated with the side walls 16 and 18 preferably are connected to the tank bottom near or at the juncture of the corresponding inclined walls 26 and 28 and flat portions 30 and 32. The spacing between adjacent pairs of the inner frame members 40 is of sufficient width to permit livestock to project their heads therethrough while standing on the ground outside the feeder.

Connected to and extending upwardly from the support flanges 23 on the side walls 16 and 18 and the end walls 20 and 22 is an outer framework 42 including a plurality of parallel, horizontally-spaced and diagonally extending bars or frame members 44 fixedly connected at their lower ends to respective support flanges 23, a vertical corner post 45 located at each corner of the tank 12, and horizontally extending upper frame members 46 fixedly connected to the upper ends of the corner posts 45 and the outer frame members 44. The inner frame members 40, the outer frame members 44, the corner posts 45 and the upper frame members 46 preferably are tubular in order to minimize weight and eliminate sharp edges which might cause injury to livestock. Also, they are preferably connected together and to the tank by welding.

The openings between adjacent pairs of the outer frame members 44 are of sufficient height and width to permit an individual livestock, particularly cattle, standing on the ground outside the feeder to insert its head therethrough and consume feed held in the feeding troughs. When the feeder 10 is to be used for storing and dispensing larger fibrous feed, such as baled or loose hay, the inner frame members 40 preferably are located close enough to the respective side and end walls to permit livestock, particularly full-grown cattle, standing on the ground outside the feeder, to reach feed located inside the rack 38. For this purpose, the inner frame members 40 preferably are angled outwardly towards, and their upper ends connected to, respective of the upper frame members 46.

Since the outer frame members 44 extend at an angle to a line perpendicular to the horizontal plane of the support flanges 23, livestock must turn or cock their heads for insertion through the openings therebetween to reach feed located in the feeding troughs and/or inside the rack 38. This tends to discourage them from pulling or dragging feed from the feeder and, instead, encourages them to eat the feed while their heads are inside the feeder. As a result, the leaves of fibrous feed, which often have more food value, accumulate in the feeding troughs instead of falling onto the ground where it can be trampled into the ground and wasted. Thus, the feeding troughs in effect serve as mangers. The diagonally extending outer frame members 44 also tend to prevent livestock from backing into the feeder and depositing droppings into the feeding troughs. The outer frame members preferably extend in a common vertical plane from the respective side or end wall.

Figure 2:
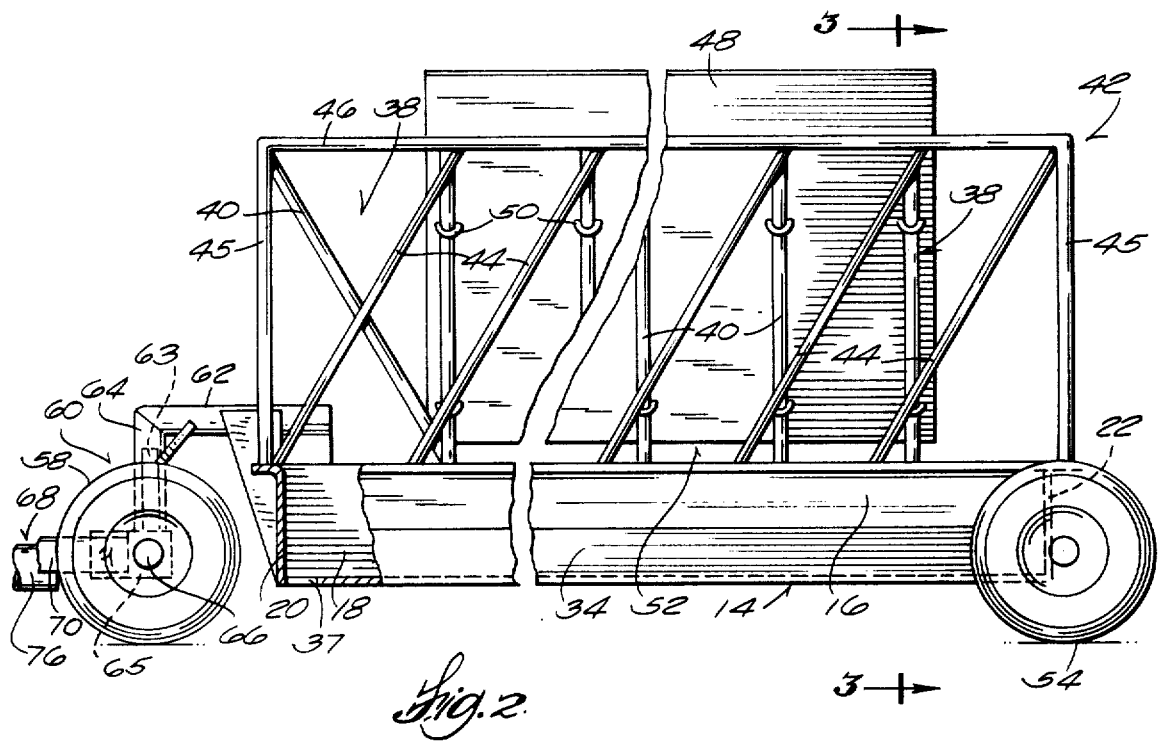
FIG. 2 is a partial side elevational view, partially sectioned, of the livestock feeder shown in FIG. 1.

As shown in FIGS. 2 and 3, the feeder 10 can be adapted to dispense loose feed, such as chopped green feed or ground feed, by providing side boards or panels 48 which are removably fastened to the inner frame members 40, such as by U-bolts 50, J-bolts or similar fastening means. The side boards 48 are made from a suitable, relatively rigid material, such as exterior plywood, pressed board compositions, etc. When large quantities of loose feed are to be introduced into the rack 38, four side boards 48 can be used, one for each row of inner frame members 40 and the ends of the side boards are mitered so that, after installation, they define a substantially solid-walled bin for receiving the loose feed. The lower edge of the side boards 48 are spaced above the bottom wall 14 of the tank 12 to provide an elongated opening 52 through which the loose feed can slide down the inclined walls 26 and 28 into respective feeding troughs. This spacing is varied depending on the specific type and particle size of the feed being dispensed. When smaller amounts of loose feed are being dispensed and the feed can be heaped in the center of the rack 38, it may be necessary to use only two side boards 48, one for each side row of the inner frame members 40 as shown in FIGS. 2 and 3.

The feeder 10 can be made mobile as a unit by mounting the tank 12 on wheels. In the specific construction illustrated, a pair of rear wheels 54 suitably mounted on the rear portion of the tank 12 via a stub axle 56 and a pair of front wheels 58 mounted on a steering assembly 60 attached to the front end of the tank 12 are provided for this purpose.

The steering assembly 60 includes a horizontal member 62 fixedly mounted on the front of the tank 14 and projecting forwardly therefrom, an upright member 64 connected to the outer end of the horizontal member 62, a steering post 63 rotatably carried by the upright member 64 and connected at the lower end to a housing 65 rotatably carrying the front wheel axle 66 and a towing pole or tongue 68 secured to the front wheel axle housing 65 in a manner permitting vertical pivotal movement of the tongue. This arrangement permits 90° turning of the feeder which facilitates maneuvering in small feed lots. Also, with this high maneuverability, the feeder 10 is capable of making quick turns which means it can be attached behind a green feed chopper in the field and the chopped feed conveyed directly into the feed receiving bin for later feeding. Since their are no tie rods which tend to loosen with use, the feeder can be towed at highway speeds without swaying.

As shown in FIGS. 1 and 4, the towing tongue 68 preferably is constructed as a telescopic unit so that its length can be varied. In the specific construction illustrated, the tongue 68 includes a channel member 70 pivotally connected at 72 to a pair of forwardly extending brackets 74 (one shown) which are fixedly attached to the front axle housing 65. Fixedly mounted on the underside of the channel member 70 is a hollow or tubular member 76 which slidably or telescopically receives a pull member 78 which preferably is also in tubular form. A pair of forwardly extending ears 80 having coaxial holes 82 are mounted on the outer end of the pull member 76 to facilitate hitching of the tongue 68 to the tow bar of a tractor, green feed chopper, etc.

The pull member 76 has a plurality of axially spaced holes 84 for receiving the inner end portion of a L-shaped latching pin 86 which extends through a bushing 88 mounted on the channel member 70 and a hole 90 in the tubular member 76 which is alignable with the pull member holes 84. The length of the tongue 68 can be varied by lifting the latching pin 86 out of engagement with the pull member holes 84, moving the pull member 78 forwardly or rearwardly with respect to the tubular member 76 until the appropriate pull member holes 84 are aligned with the tubular member hole 90 and then dropping the latching pin 86 through the aligned holes. With this arrangement, the tongue 68 can be shortened to a length which is more suitable for relatively close hitching of the feeder behind a green feed chopper in the field or lengthened to a length more suitable for over-the-road travel or movement in a feed lot.

The feeder can be used as a bunk, in which case the tank is not mounted on wheels and is merely towed on runners or skids or slid on the bottom itself.

The tank 12 is arranged so that the side walls 16 and 18 and the end walls 20 and 22, even when the tank 12 is mounted on wheels as illustrated, are at a height where both young and full-grown livestock can stand on the ground outside the feeder and eat comfortably from the feeding troughs. As a guide, the support flanges 23 are located at a height generally corresponding to that of a standard size farm wagon tire as shown.

FIG. 5 illustrates an alternate arrangement for the connection of the upper ends of the inner frame members of the rack to the upper frame members 46. In this embodiment, the upper portion of each inner member 92 extends above the upper frame member 46 and includes an angled extension 94 which is connected to the frame member 46. Also, the lower portions of the inner frame members 40 can be arranged to curve outwardly toward the outer frame members 44 (rather than being substantially straight as illustrated) to provide closer access to round baled hay held in the rack 38.

FIG. 6 illustrates an alternate arrangement for the outer frame members. In this embodiment, alternate, adjacent pairs of the outer frame members 100, 102 and 104, 106 are arranged to provide a generally V-shaped opening 108 through which an individual livestock can insert its head to reach the feed inside the feeder. The lateral spacing between the lower portions of these outer frame members is small enough to require the livestock to raise its head before it can be inserted through the opening 108 but large enough to permit comfortable eating from a feeding trough thereafter, i.e., the apex portion of the V-shaped opening 108 accommodates the animal's neck. This tends to discourage the livestock from dragging fibrous feed from the feeder. Suitable blocking means, such as one or more horizontally extending bars 110, are provided between the other alternate, adjacent pairs of the outer frame members, e.g., 102 and 104, to prevent the livestock from either eating through or backing into the inverted V-shaped opening therebetween.

From the above description of the preferred embodiment, it can be seen that the feeder provided by this invention, while simply constructed, has several advantages and can be used for dispensing a wide variety of livestock feeds. For instance, both young and full-grown cattle can comfortably feed from all four sides of the feeder while standing on the ground outside the feeder, thereby eliminating the need for the livestock (particularly young or smaller animals) to pull fibrous feed from the feeder and the potential waste associated with portions dropping on the ground. The diagonal or slant arrangement of the outer frame members 44 further minimizes the tendency of the feed to be pulled from the feeder. The feeding troughs between the inner rack and the tank side and end walls act as a manger for accumulating the leaves of fibrous feeds and permits the feeder to be used for loose feeds, such as chopped green feed and ground feed, when the removable side boards 48 are installed. The unit body construction of the tank, the rack and the outer framework provides a sturdy, long lasting structure permitting the feeder to be towed at highway speeds. The high maneuverability of the feeder facilitates its use in smaller feed lots and permits it to be towed behind a green feed chopper in the field.

From the foregoing description, one skilled in the art can easily ascertain the essential characteristics of this invention, and without departing from the spirit and scope thereof, can make various changes and modifications of the invention to adapt it to various uses.

I claim:

1. A mobile livestock feeder for dispensing a variety of feeds, including baled feed and fine feeds, said feeder comprising a relatively shallow, open-top tank including a solid bottom and an opposed pair of side walls and an opposed pair of end walls, both extending upwardly from the periphery of said bottom and having a generally vertically extending upper portion, said tank bottom having a raised central portion including a pair of oppositely inclined, longitudinally extending wall portions each of which extend downwardly and outwardly towards respective of said side walls and terminate in a lower edge portion spaced inwardly from respective of said side walls and a pair of longitudinally extending base wall portions extending generally horizontally between and integrally connecting respective of said side walls and said inclined wall portions, said base wall portions cooperating with said side walls and said inclined wall portions to define feeding troughs situated wholly inside said side walls for holding feed, an outer framework including a plurality of horizontally-spaced outer frame members disposed in parallel relationship and extending upwardly at a slant from at least said tank side walls whereby adjacent pairs of said outer frame members define an angled first feeding opening through which individual livestock, either young or full-grown, can project its head and consume feed held in a respective one of said feeding troughs and which require the livestock to cock its head for projecting through said first feeding opening, thereby discouraging it from dragging loose feed through said first feeding opening, said outer framework further including generally horizontally upper frame members connected to the upper ends of said outer frame members, an inner rack including a plurality of horizontally-spaced, inner frame members having a lower end rigidly supported from said tank bottom at a location spaced inwardly from respective of said tank side walls, extending upwardly and outwardly at an incline toward respective of said upper frame members and having an upper end connected to respective of said upper frame members, adjacent pairs of said inner frame members defining a second feeding opening through which at least full-grown livestock, with its head projecting through a first feeding opening, can also project its head to consume feed held in said inner rack, front and rear wheels supporting said tank for over-the-ground travel of said feeder with said tank walls at a height which is comfortable for both young and full-grown livestock to project its head through one of said first openings and comfortably consume feed from said feeding troughs while standing on the ground outside said feeder, said front wheels including a pair of wheels mounted on axle means carried by a steering assembly connected to the front end of said tank, and said steering assembly including a steering member mounted for rotation about a vertical axis spaced forwardly of said tank to permit 90° turning of said feeder and tongue means connected to said steering member for towing said feeder and turning said front wheels.

2. A livestock feeder according to claim 1 wherein said tongue means includes first and second elongated tongue members mounted in telescopic relationship so that one of said tongue members can be moved axially relative to the other of said tongue members to vary the length of said tongue means, and latching means for selectively latching said tongue members together at relative positions corresponding to a desired length for said tongue means.

3. A livestock feeder according to claim 1 wherein said tank walls and said tank bottom are of unit body construction.

4. A livestock feeder according to claim 1 wherein said tank bottom includes marginal portions adjacent said side walls inclining upwardly and outwardly toward respective of said side walls.

5. A livestock feeder according to claim 1 wherein said outer framework includes a plurality of said outer frame members extending upwardly from all of said tank side and end walls, and said inner rack includes a plurality of said inner frame member associated with each of said tank side and end walls, whereby livestock can consume feed in said feeding troughs and in said inner rack from all four sides of said tank while standing outside of said feeder.

6. A livestock feeder according to claim 1 wherein said lower ends of said inner frame members associated with said tank side walls are located at the juncture between respective of said bottom inclined wall portions and said bottom base wall portions.

7. A livestock feeder comprising a tank for receiving and holding feed including a solid bottom and opposed walls extending upwardly from said bottom, said bottom including portions which cooperate with said tank walls to define feeding troughs for holding fine feeds and from which livestock can consume feed while standing outside of said tank;

an outer framework including a plurality of outer frame members extending upwardly from respective of said tank walls, adjacent pairs of said outer frame members defining an opening through which individual livestock can project its head and comfortably consume feed held in a feeding trough, said opening having a shape requiring the livestock either to cock or to raise its head for projection therethrough, thereby discouraging it from dragging feed through said opening, an inner rack disposed inside said tank for receiving feed and including a plurality of horizontally-spaced, inner frame members extending upwardly from said tank bottom, the lower ends of said inner frame members being spaced inwardly from respective of said tank walls to define said feeding troughs, solid panels adapted for attachment to respective of said inner frame members and cooperate with said rack and the portion of said tank bottom disposed inside said rack to define a bin for holding a quantity of loose feed, and, means for removably and adjustably mounting said panels on said inner frame members to vary the spacing between the lower edge of said panels and said tank bottom through which feed can slide from said bin into said feeding troughs.

8. A mobile livestock feeder for dispensing a variety of feeds, including baled feed and fine feeds, said feeder comprising a relatively shallow, open-top tank including a solid bottom and an opposed pair of side walls and an opposed pair of end walls, both extending upwardly from the periphery of said bottom and having a generally vertically extending upper portion, said tank bottom having a raised central portion including a pair of oppositely inclined, longitudinally extending wall portions each of which extend downwardly and outwardly towards respective of said side walls and terminate in a lower edge portion spaced inwardly from respective of said side walls and a pair of longitudinally extending base wall portions extending generally horizontally between and integrally connecting respective of said side walls and said inclined wall portions, said base wall portions cooperating with said side walls and said inclined wall portions to define feeding troughs situated wholly inside said side walls for holding feed, an outer framework including a plurality of horizontally-spaced outer frame members disposed in parallel relationship and extending upwardly at a slant from at least said tank side walls whereby adjacent pairs of said outer frame members define an angled first feeding opening through which individual livestock, either young or full-grown, can project its head and consume feed held in a respective one of said feeding troughs and which require the livestock to cock its head for projecting through said first feeding opening, thereby discouraging it from dragging loose feed through said first feeding opening, an inner rack including a plurality of horizontally-spaced, inner frame members having a lower end rigidly supported from said tank bottom at a location spaced inwardly from respective of said tank side walls and extending upwardly and outwardly at an incline toward respective of said upper frame members, adjacent pairs of said inner frame members defining a second feeding opening through which at least full-grown livestock, with its head projecting through a first feeding opening, can also consume feed held in said inner rack, front and rear wheels supporting said tank for over-the-ground level of said feeder with said tank walls at a height which is comfortable for both young and full-grown livestock to project its head through one of said first openings and confortably consume feed from said feeding troughs while standing on the ground outside said feeder, said front wheels including a pair of wheels mounted on axle means carried by a steering assembly connected to the front end of said tank, said steering assembly including a steering member mounted for rotation about a vertical axis spaced forwardly of said tank to permit 90° turning of said feeder and tongue means connected to said steering member for towing said feeder and turning said front wheels, solid panels adapted for attachment to respective of said inner frame members and to cooperate with said rack and the portion of said tank bottom disposed inside said rack and the portion of said tank bottom disposed inside said rack to define a bin for holding a quantity of loose feed, and means for removably and adjustably mounting said panels on said inner frame members to vary the spacing between the lower edge of said panels and said tank bottom through which feed can slide from said bin into said feeding troughs.

* * * * *